United States Patent [19]
Song

[11] Patent Number: 5,391,042
[45] Date of Patent: Feb. 21, 1995

[54] TRUCK FOR CARRYING GOODS

[76] Inventor: Hwa S. Song, 209 Ssangchon-dong, Seo-gu, Kwangju-city 502-260, Rep. of Korea

[21] Appl. No.: 139,931

[22] Filed: Oct. 20, 1993

[30] Foreign Application Priority Data

Mar. 6, 1993 [KR] Rep. of Korea ............... 1993-3394

[51] Int. Cl.6 .................................................. B60P 1/54
[52] U.S. Cl. ........................................ 414/542; 414/560; 414/541; 212/225; 212/245; 212/254; 296/26
[58] Field of Search ................ 414/342, 348, 539, 540, 414/541, 542, 543, 560, 561, 592, 501, 662, 663, 744.2, 744.8, 522, 477, 467, 478; 212/223, 224, 225, 242, 243, 266, 251, 245, 254; 296/1.1, 164, 165, 170, 171, 175, 26, 27, 181, 182, 183, 50

[56] References Cited

U.S. PATENT DOCUMENTS

| | | | |
|---|---|---|---|
| 1,899,849 | 2/1933 | Burek | 414/522 X |
| 2,088,122 | 7/1937 | Taylor | 414/560 X |
| 2,177,525 | 10/1939 | Henderson | 414/542 |
| 2,778,512 | 1/1957 | Strona | 414/542 |
| 3,876,226 | 4/1975 | Cutler . | |
| 4,187,048 | 2/1980 | Bohlmann | 414/542 |
| 4,187,927 | 2/1980 | Byrne . | |
| 4,239,440 | 12/1980 | James . | |
| 4,721,431 | 1/1988 | Ostermeyer | 414/542 |
| 5,062,760 | 11/1991 | Samaniego | 414/542 |

FOREIGN PATENT DOCUMENTS

| | | | |
|---|---|---|---|
| 1421478 | 11/1965 | France | 414/541 |
| 678269 | 9/1952 | United Kingdom | 414/542 |
| 679285 | 9/1952 | United Kingdom | 414/522 |
| 2105294 | 3/1983 | United Kingdom | 414/542 |
| 130171 | 10/1978 | U.S.S.R. | 414/560 |
| 1049289 | 10/1983 | U.S.S.R. | 414/560 |

*Primary Examiner*—Frank E. Werner
*Attorney, Agent, or Firm*—Vidas, Arrett & Steinkraus

[57] ABSTRACT

A truck for unloading goods includes a lower supporting member carried by the truck frame. The support member together with its side walls may be moved forward and backward by a screw driven mechanism. The doors to open the side walls open in response to movement of the support member. The truck includes a built in crane and bed leveling feet which engage the ground.

1 Claim, 7 Drawing Sheets

TRUCK FOR CARRYING GOODS

FIELD OF THE INVENTION

The present invention generally relates to a truck for carrying goods and more particularly to the truck for conveying goods adapted for transferring the loaded goods to the loading position of a larger means for conveying goods in a stabilized state.

BACKGROUND OF THE INVENTION

In an ordinary truck for carrying goods now widely used, it is well known that the truck is loaded at a goods-loading station or the goods are transferred to a larger vehicle, such as a train and so on, by the use of a crane, forklift truck or by the direct action of a person.

However, the prior art truck for carrying goods described above includes several defects in that the heavy or bulky goods can only be loaded or unloaded with the aid of other machines (or the exception of some special vehicles) and that small and light goods must be carried one at a time by a person. Where the truck for carrying goods is adapted for raising or lowering the goods-loading station by a hydraulic cylinder, the goods may fall out when unloading them and therefore the goods could not used if broken, with the exception of some goods such as sand or gravel.

In particular, the prior art truck for carrying goods has many disadvantages in that other machines must be used or a person must carry the goods one by one, when transferring goods loaded into the small truck for carrying them to another large truck for carrying goods or a freight train.

It is accordingly a primary object of the present invention to provide a truck for carrying goods adapted for transferring the loaded goods to the goods-loading station of the larger means for conveying goods in a stabilized state.

Another object of the present invention is to provide a truck for carrying goods in which the heavy or bulky goods can be simply loaded or unloaded.

In order to achieve the foregoing objects, according to the present invention, lockers having elastic action provided by a spring are mounted at the back of the supporting member located on the bottom plate. The supporting member moves forward and backward according to the clockwise or counterclockwise rotation of the bolt bar inserted into the nut holes in the bottom plate and supporting member. The doors of the side member move backward together with the side member which is supported on the projections formed at both front sides of said supporting member. The doors are retained in the locked condition by said lockers. The working bar of the crane member, on which a hook is provided, is moved forward and backward according to the guide bar fixed rotatably to the truck body and is moved forward by the hydraulic cylinder and at the same time advances said side into its original state. Four pillars support the fixed bar on which the crane member is supported. The truck body is stabilized by four supporting bars that are adjusted hydraulically to level the body to the ground. Thereby the loaded goods as well as the transport of the heavy goods can be unloaded in a stabilized rate.

The foregoing and other objects as well as advantages of the present invention will become clear by the following description of the invention with reference to the accompanying drawings.

DETAILED DESCRIPTION OF THE PREFERRED EMBODIMENT

An embodiment of the truck for carrying goods according to the present invention will hereinafter be described with reference to FIGS. 1 to 7.

Figure 1:
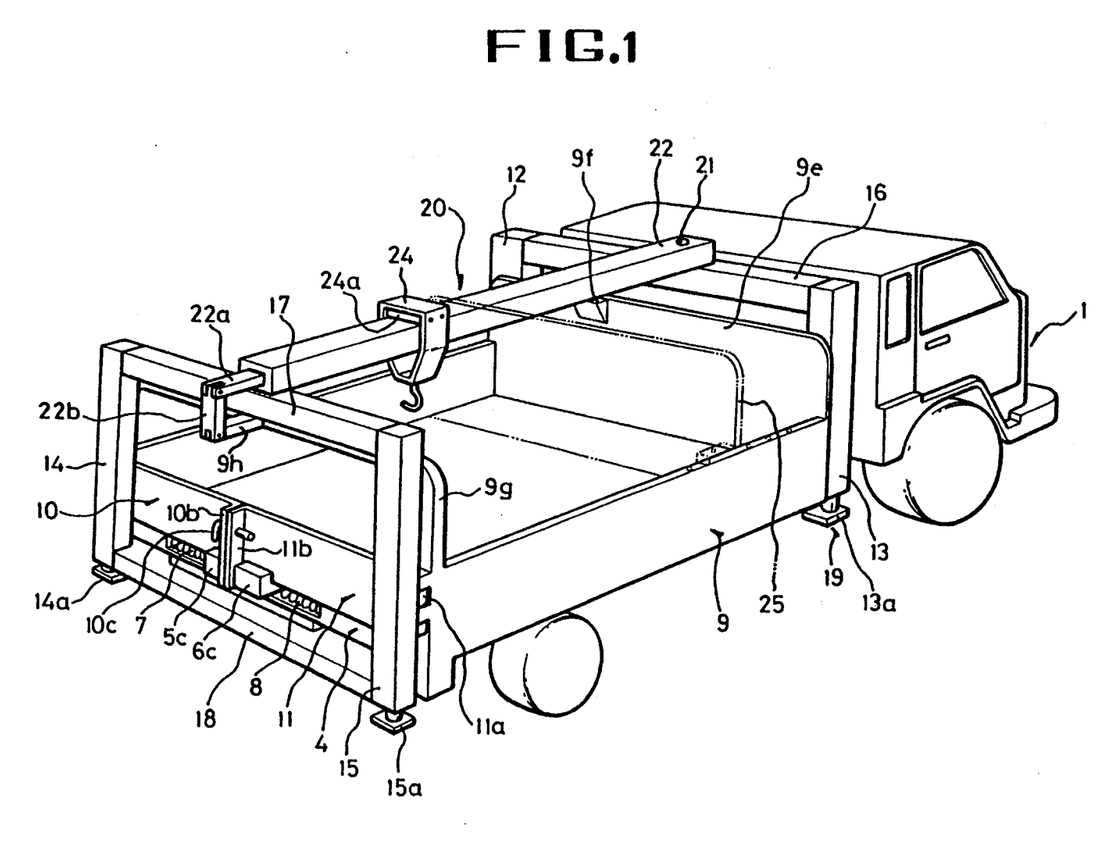
FIG. 1 is a perspective view showing the construction of the present invention.
Figure 2:
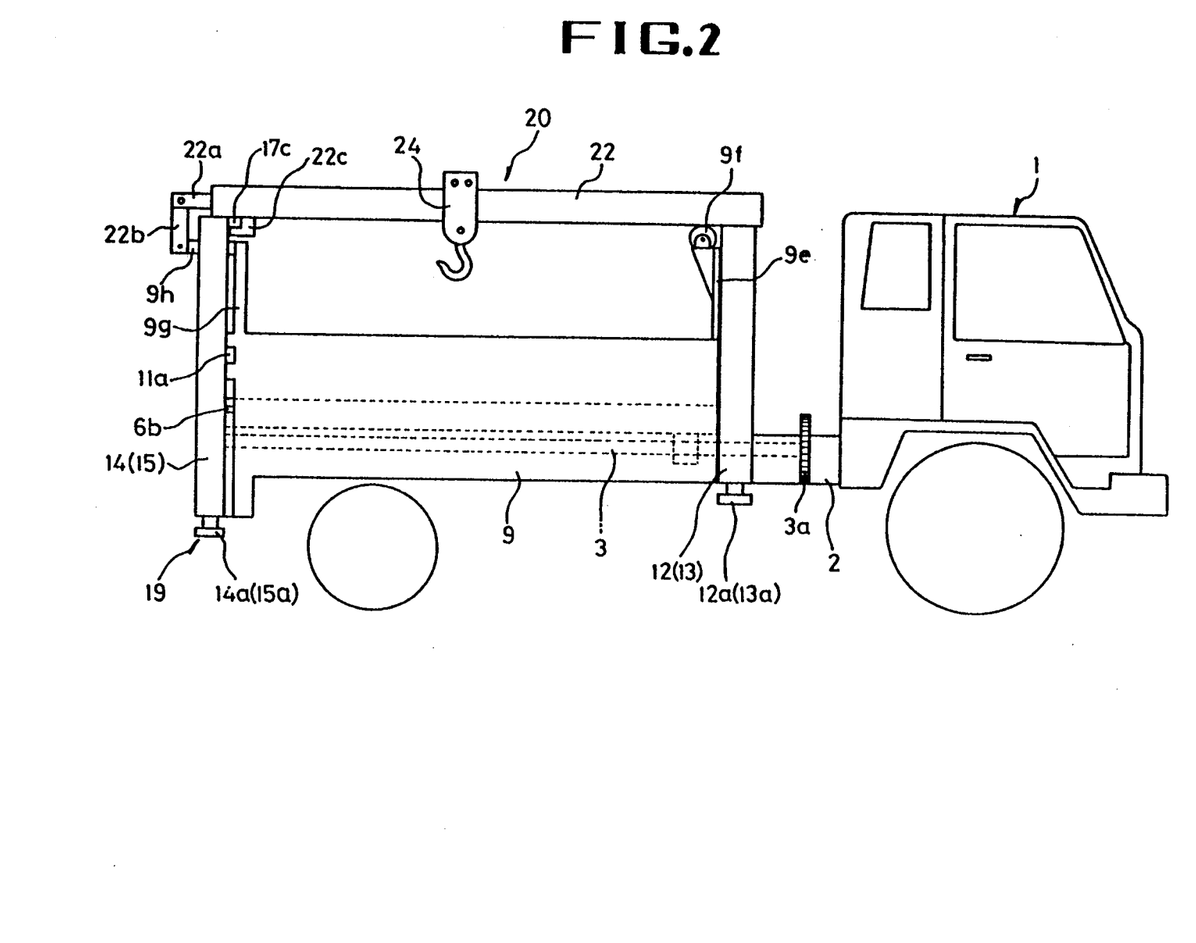
FIG. 2 is a side view of the present invention.
Figure 3:
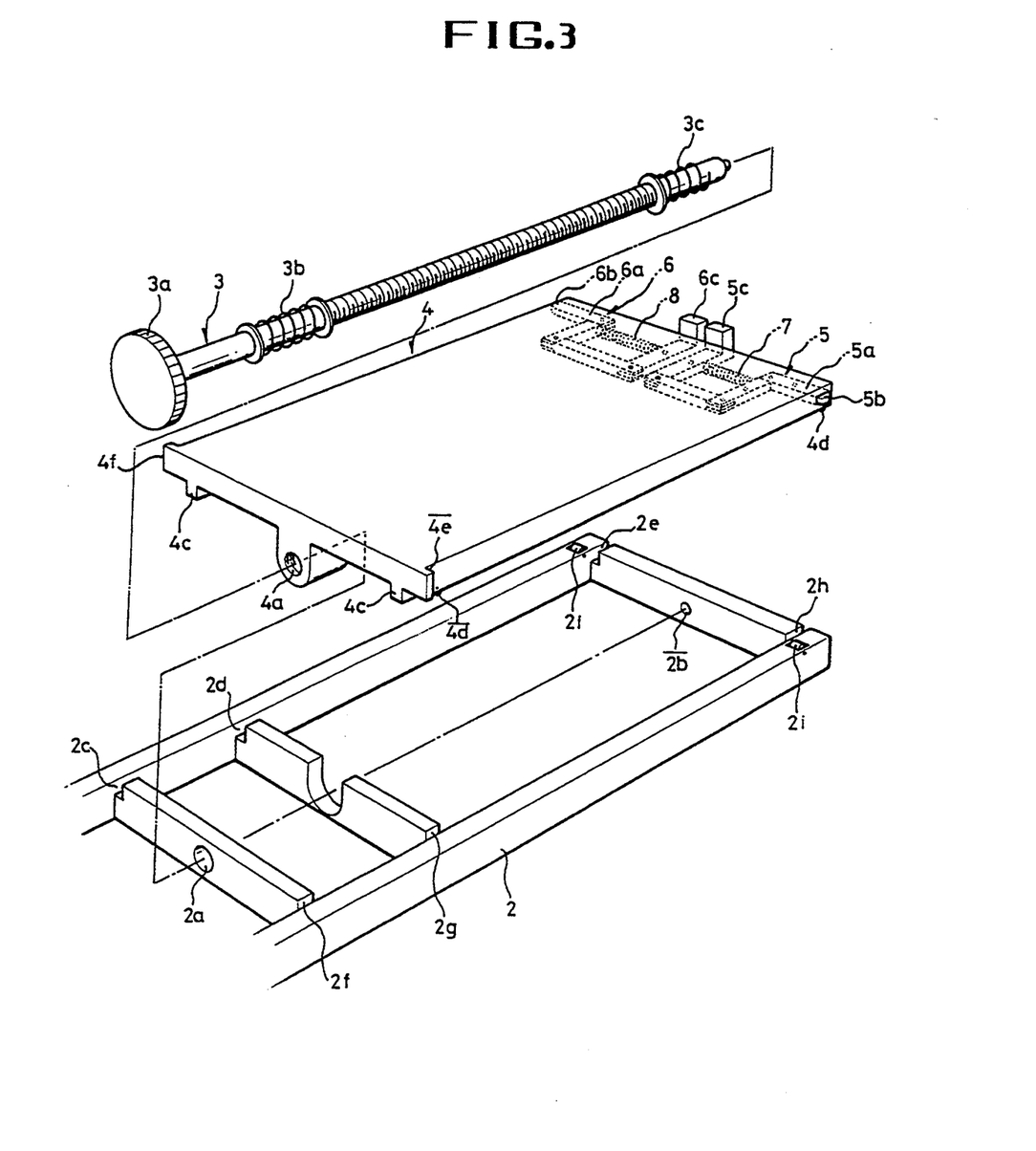
FIG. 3 is an exploded perspective view of the supporting member of the present invention.

FIGS. 1 and 2 show the external construction of the truck for carrying goods according to the present invention in which power-generating means for driving the vehicle is provided and power-supplying means for switching and supplying said power is provided. As shown in FIGS. 1 and 2, supporting member 4 is moved forward and backward by means of rotation of bolt bar 3 located on the bottom plate 2 of the truck body 1 and receives the power through the gear 3a. As shown in FIG. 1, doors 10, 11 which rotate about hinges 10a, 11a, and are locked by means of locker pin 10c, are located at the extremity of side member 9 moving backward only when said supporting member 4 is moved backward. As shown in FIG. 3, lockers 5, 6 are located symmetrically at the rear end of the supporting member 4. Pushing pieces 5c, 6c of lockers 5, 6 compress springs 7, 8 and at the same time release locking pieces 10b, 11b of the doors 10, 11 from the locked condition when projections 5b, 6b contact the inside of the side member 9. That is, as the supporting member 4 moves backward, projections 5b, 6b come in contact with side member 9, depress and cause springs 7, 8 to compress which releases the locks.

Figure 6:
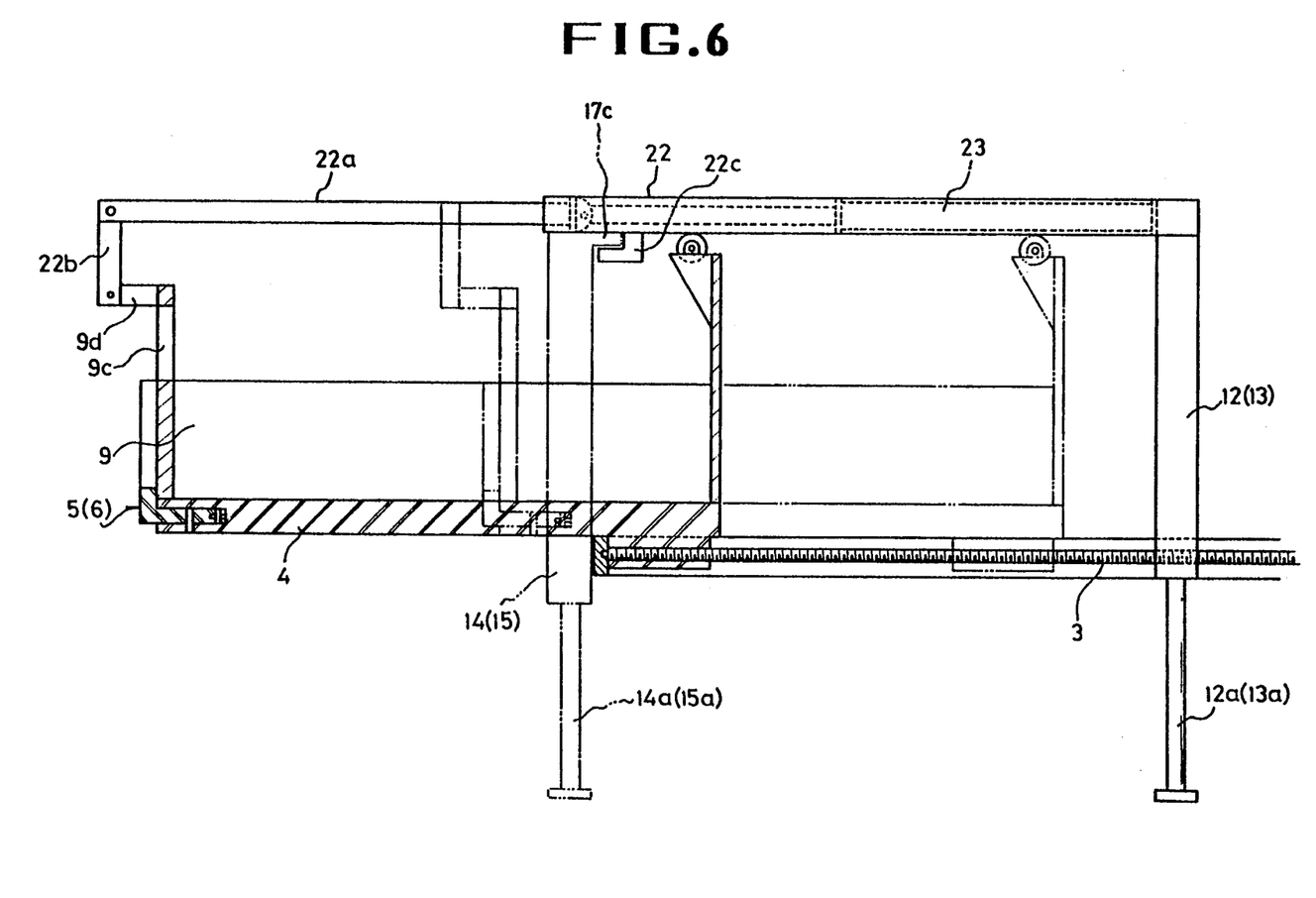
FIG. 6 is a cross-sectional view of the principal part showing the working condition of the supporting member and the side member of the present invention.
Figure 7:
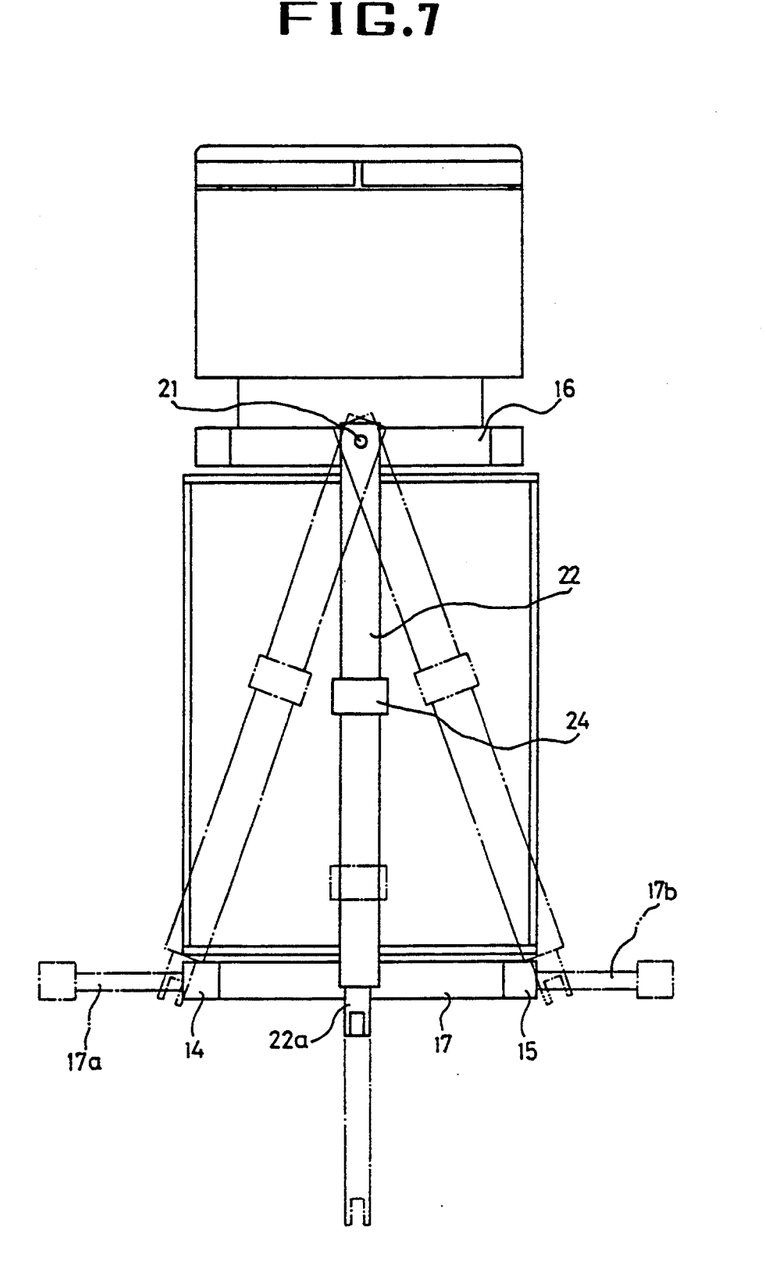
FIG. 7 is plan view showing the construction of the crane member of the present invention.

As shown in FIGS. 1, 2 and 6, four pillars 12, 13, 14, 15 are located at the front and rear sides of four corners of the bottom plate 2 in which supporting bars 12a, 13a, 14a, 15a are raised and lowered by means of a built-in hydraulic cylinder (not shown). The front two pillars 12, 13 are fixedly located with the top fixed bar 16 and the rear two pillars 14, 15 are expansibly located outwardly by means of the top fixed bar 17 and the bottom fixed bar 18.

Guide bar 22 of crane member 20 in which its one end is fixed to the fixed bar 16 through the axis 21 and rotatably located by the conventional power-transmitting means is supported by supporting roller 9f provided at the top side of the front plate 9e of the side member 9. Working bar 22a is moved forward and backward by means of hydraulic cylinder 23 (shown in FIG. 6) located in the inside of said guide bar 22 in which locking jaw 22c is supported to the locking projection 17c of the fixed bar 17 and hook 24 is smoothly moved by the roller 24a. The locking piece 22b extends between the working bar 22a and the connecting bar 9h, which is fixed to the connecting bar 9g of the side member 9. Locking piece 22b is removably connected to the working bar and connecting bar by a pin.

Figure 4:
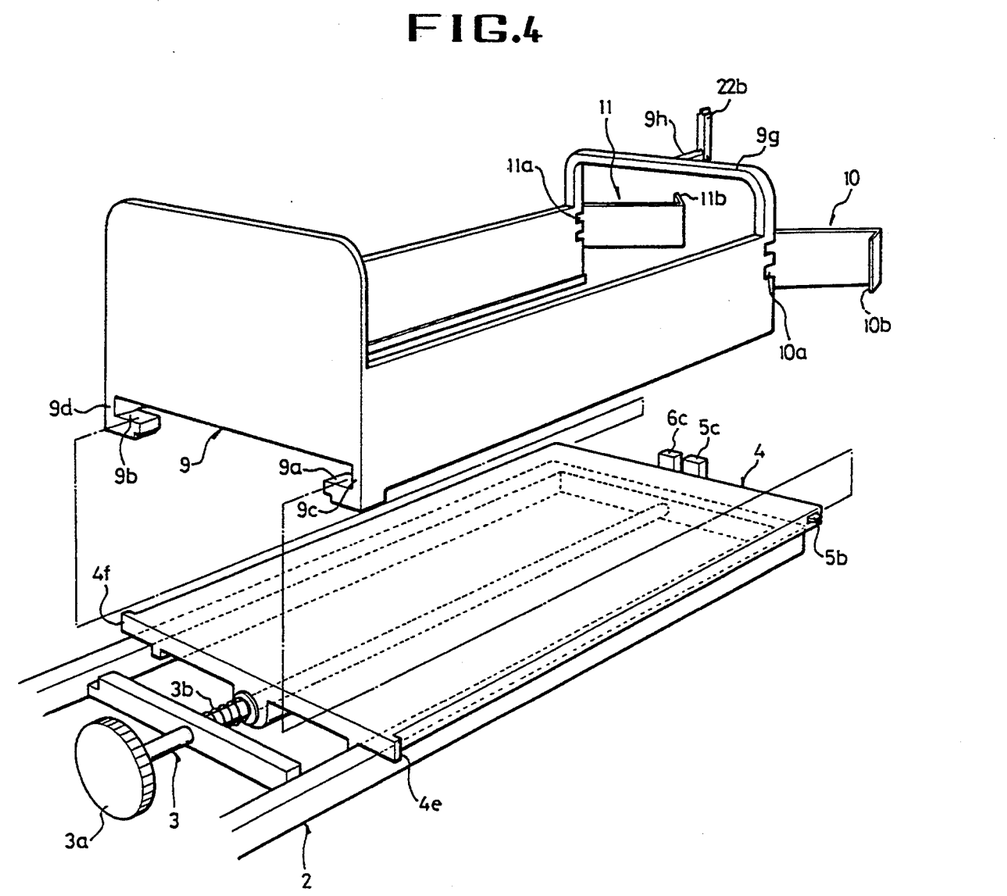
FIG. 4 is an exploded perspective view of the supporting member and side member of the present invention.

FIGS. 3 and 4 show the construction of the supporting member and the side member. As shown in FIGS. 3 and 4, bolt bar 3 which extends through holes 2a, 2b of the bottom plate 2, receives power through the gear 3a and at the same time is smoothly rotated by the springs 3b 3c.

Supporting member 4, in which said bolt bar 3 is threadedly connected to the nut portion 4a and moved forward and backward, is smoothly moved forward and backward by means of rollers 4d of the supporting member 4 and rollers 2i of the bottom plate in that the guide protrusions 4b, 4c are fitted in the guide grooves 2c, 2d, 2e, 2f, 2g, 2h. Two lockers 5, 6 are symmetrically located at the rear end of the supporting member 4 formed with the projections 4e, 4f, and when the projections 5b, 6b are pushed backward by the side member 9 they receive the elasticity of the springs 7, 8 of the working pieces 5a, 6a. At the same time the pushing pieces 5c, 6b are spread to both sides, thereby the locking piece 10b, 11b of the doors 10, 11 are released from their locked condition. The projections 4e, 4f of the supporting member 4 engage the extremities 9c, 9d of the guide grooves 9a, 9b, the side member forms a loading box having no bottom. Doors 10, 11 which rotate about the hinges 10a, 11a are located at the end of the side member 9 and are locked by the lockers 5, 6 and the locker pin 10c.

In order for the side member 9 and the supporting member 4 to be smoothly moved forward and backward on the bottom plate 2, it is possible to use parts other than the roller. The portion of the side member 9 can be opened and closed collapsibly as in a conventional truck and therefore the goods can be loaded with less force.

Therefore, in the truck for carrying goods so constructed according to the present invention, it is possible to load the loaded goods into the goods-loading station of the larger means for conveying goods in a stabilized state by using the crane 20 or by a person and it is also possible to install it in the small truck or the cultivator.

Figure 5:
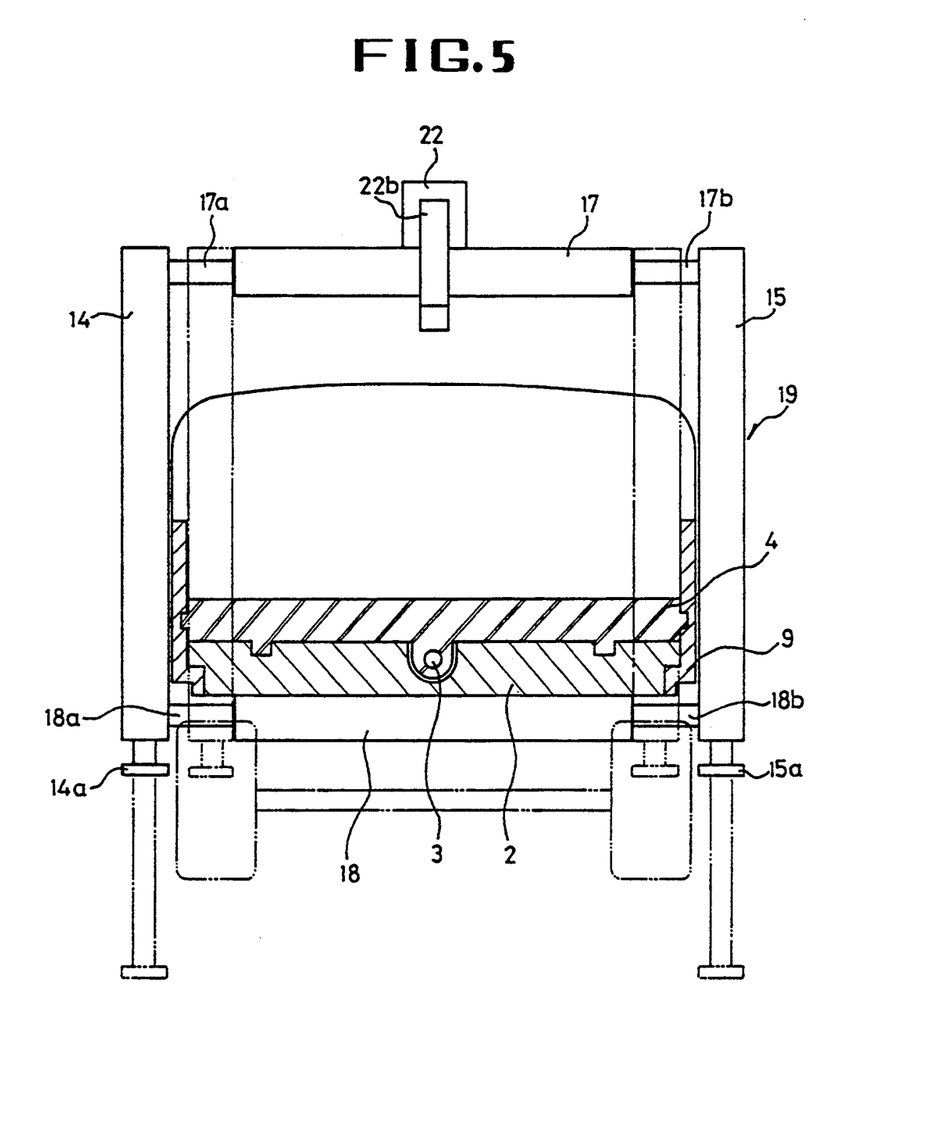
FIG. 5 is a schematic view showing the construction of the upholding member, the supporting member and the side member of the present invention.

In case that the goods loaded in the loading space limited by the supporting member and the side member 9 are transferred to the goods-loading position of the larger means for carrying goods, after the vehicle body 1 is stopped in the close vicinity of the loading position, the hydraulic cylinder installed in the inside of the lower fixed bar 18 of the upholding member 19 is driven and allows two cylinder bars 18a, 18b to be spread to a certain extent, as shown in FIG. 5. Thereby two rear pillars 14, 15 allow two slide bars 17a, 17b to be spread and at the same time to be spread wider than the width of the doors 10, 11.

As shown in FIGS. 5 and 6, hydraulic cylinders installed in the inside of four pillars 12, 13, 14, 15, respectively, are driven and at the same time the supporting bars 12a, 13a, 14a, 15a are lowered, thereby only the body 1 is fixed according to the height of the loading position or the body 1 is raised to a desired height.

If the gear 3a of the supporting member 4 is rotated counterclockwise by the power-transmitting means, the bolt bar 3 rotating with the gear 3a is also rotated, thereby nut portion 4a joined to the bolt bar 3 is moved behind the body 1 that is the loading position and so the supporting member 4 provided with the nut portion 4a thereunder is also moved behind the body that is the loading position. At this time, excessive movement is prevented by the springs 3b, 3c of the bolt bar 3 and at the same time an elastic force is obtained at the beginning in the desired moving direction by the elasticity of the springs 3b 3c.

Supporting member 4 is held to guide grooves 9a, 9b of the side member 9 formed by extremities 9c, 9d by engagement with projections 4e, 4f. The side member 9 is thereby moved according to the movement of the supporting member 4. At this time, the working bar 22a of the crane member 20 in which the fixed piece 22b is connected to the connecting bar 9g through the connecting bar 9h is also withdrawn from the guide bar 22 by means of the hydraulic cylinder 23 and at the same time the goods loaded into the loading space formed by the supporting member 4 and the side member 9 are also moved to the loading position.

The supporting member 4 can be smoothly moved forward and backward on the bottom plate 2 by the roller 2i and the guide groove 2d.

In the manner in which the goods are moved to the loading position, only the supporting member 4 is moved forward to the original state by rotating the bolt bar 3 while rotating the gear 3a clockwise through said power-transmitting means.

Thus a stable forward movement is obtained by the roller 4d of the supporting member 4 and roller 21 of the bottom plate 2.

At this time, as the working bar 22a is prevented from being pulled by the hydraulic cylinder 23 installed inside of the guide bar 2, the side member 9 connected to the fixed piece 22b of the working bar 22a through the connecting bar 9h remain still in its position and at the same time only the supporting member 4 begins to return to its original state.

Therefore, in the state in which goods are loaded on the supporting member 4, the goods are prevented from tipping over and falling by the side member 9.

If it is desired to transfer the standardized goods in a stacked state, the locking pieces 10b, 11b of the doors 10, 11 are locked by the locker pin 10c in order not to be opened. Then the loaded goods are moved downward in the loaded state. On the one hand, if it is desired to transfer the goods quickly, when the locker pin 10c of the locking pieces 10b, 11b is unlocked, the outward projections 5b, 6b are hooked on both sidewalls of the side member 9 and at the same time the pushing pieces 5c, 6c of the lockers 5, 6 release the state supported elastically by the springs 7, 8 while the supporting member 4 is moved to its original state. Thereby the doors 10, 11 are opened while rotating about the hinges 10a, 11a.

It is possible to stack the goods as the loaded layer having a desired height while maintaining the goods in the almost state at the loading position according to the movement of the supporting member 4 regardless of opening and closing of the doors 10, 11.

In this manner, only the supporting member 4 is returned to its original state and at the same time the goods are fully transferred to another loading position, the hydraulic cylinder 23 of the guide bar 22 is operated to pull the side member 9 together with the working bar 22a and at the same time to return them to their original states.

Then the hydraulic cylinders of four pillars 12, 13, 14 and 15 are counterdriven to raise the supporting bars 12a, 13a, 14a, 15a, and return them to their original positions. Thereafter, the hydraulic cylinder of the lower fixed bar 18 is counterdriven to pull the rear two pillars 14, 15 to the positions of the doors 10, 11 by the two cylinder bars 18a, 18b.

On the one hand, if the heavy goods are loaded or unloaded, the bolt or the connecting pin connecting the connecting bar 9h and the fixed piece 22b is removed. Thereafter, by using the hook 24 movably mounted on the working bar 22a which is moved forward and backward by means of the hydraulic cylinder 23, it is possible to lift the rear heavy goods and then to load them directly in the loading station or to load them on the supporting member 4 which has just been moved in the same method as described above and is then returned to its original state.

If the side heavy goods are loaded, the connection between the working bar 22a and the fixed piece 22b is released to allow the working bar 22a and the guide bar 22 to rotate to a certain extent about the axis 21. Thereby it is possible to load the heavy goods within the turning radius thereof.

At this time, if necessary, the collapsible side is opened and then reassembled after finishing work. Therefore, the work can be easily done.

If it is desired to adjust the volume to be conveyed at a time according to the loading position, as shown in dotted line in FIG. 1, the partition 25, which is simple to assemble and disassemble, can be installed within the side member 9 to load the goods one after another from the bottom of the loading position one at a time.

On the one hand, if it is desired to close the open doors 10, 11, the supporting bars 14a, 15a of the rear pillars 14, 15 are raised to a certain extent or the supporting bars 12a, 13a of the front pillars 12, 13 are lowered to a certain extent. Then the doors 10, 11 are closed to themselves by the weight of the doors 10, 11 and the slant toward the body 1.

Also, if only the supporting bars 12a, 13a of the front pillars 12, 13 are lowered to be sloped backward in the state in which the locker pin 10c of the doors 10, 11 are released or the hinges 10a, 11a are released, the goods can be unloaded as in a dump truck.

Therefore, according to the truck for carrying goods of the present invention, after the supporting member 4, together with the side member 9 is moved backward, the goods can be transferred to the desired loading position in a stabilized state while returning the supporting member 4 only to its original state.

Also it is possible to load or unload the heavy goods by installing hook 24 on the guide bar 22 or the working bar 22a.

The above description is given on a single preferred embodiment of the invention, however it will be apparent that modifications and variations could be effected by one skilled in the art without departing from the spirit or scope of the novel concepts of the invention as defined in the appended claims.

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A truck for carrying goods comprising:
    a truck body (1) including a bottom plate (2) having from and rear ends and two opposite sides;
    a supporting member (4) installed on the bottom plate (2) and slidable forwardly and rearwardly on the bottom plate (2), the supporting member (4) providing a goods-carrying platform, having front, rear and opposite side edges, and including a pair of projections (4e) (4f) extending from the opposite side edges at the rear thereof;
    a side member (9) mounted on the supporting member (4) so as to allow forward and rearward sliding movement along the supporting member (4), the side member (a) comprising a front wall, opposing side walls and a rear door frame member (9g) hingedly supporting a pair of rear doors (10) (11); the side member (9) further comprising lower extremity portions (9c) (9d) on opposite sides of the front wall which are engaged by the projections (4e) (4f) of the supporting member (4) when the supporting member is moved rearward;
    means (3) for moving the supporting member (4) forward and rearward along the bottom plate;
    releasable locking means (5) (5a) (5b), (6) (6a) (6b) (7) (8) for locking the doors (10 (11) in closed position and releasing the doors in response to rearward positioning of the side member (9) relative to the support member (4);
    a pair of upwardly extending from pillars (12) (13) fixedly joined to the opposite sides of the bottom plate (3) at the front, the front pillars each including therein a downwardly extending telescoping front supporting bar (12a) (13a);
    hydraulic means for raising and lowering the front supporting bars (12a) (13a);
    an upper front crossbar (16) fixedly joining the two front pillars at upper ends thereof;
    a lower rear crossbar (18) fixed to the rear of bottom plate (2), the lower rear crossbar including telescoping cylinder bars (18a) (18b) extending from each end thereof;
    two upwardly extending rear pillars (14) (15) at opposite sides of the bottom plate (2) at the rear thereof, the rear pillars connected at the upper ends thereof to a pair of slide bars (17a) (17b) slidably carried within an upper rear crossbar (17), each rear pillar (14) (15) connected at a lower end thereof to the bottom plate (2) by attachment to the cylinder bar (18a) (18b) extending toward that pillar's respective side, and each rear pillar (14) (15) including therein a downwardly extending telescoping rear supporting bar (14a) (15a);
    hydraulic means for raising and lowering the rear supporting bars (14a) (15a);
    hydraulic means for extending and retracting the cylinder bars (18a) (18b);
    a guide bar (22) pivotally fixed at one end to the upper from crossbar (16) at a central axis (21) and supported at the other end by the upper rear crossbar (17), the guide bar carrying a moveable hook (24);
    a working bar (22a) slidably mounted in the guide bar (22) and extending out from said other end of the guide bar;
    hydraulic means for extending and retracting the working bar; and
    means (22b) (9h) removably connecting the working bar to the door frame member (9g).

* * * * *